United States Patent [19]
Dischert et al.

[11] 4,110,785
[45] Aug. 29, 1978

[54] CLOCK GENERATOR FOR VIDEO SIGNAL PROCESSING

[75] Inventors: Robert Adams Dischert, Burlington; James Morgan Walter, Columbus, both of N.J.

[73] Assignee: RCA Corporation, New York, N.Y.

[21] Appl. No.: 793,412

[22] Filed: May 3, 1977

[51] Int. Cl.² .......................... H04N 5/795; H04N 9/46
[52] U.S. Cl. ............................................ 358/19; 358/8
[58] Field of Search ........................... 358/4, 8, 17, 19

[56] References Cited
U.S. PATENT DOCUMENTS

| 3,860,952 | 1/1975 | Tallent et al. | 358/8 |
| 4,018,990 | 4/1977 | Long et al. | 358/8 |

Primary Examiner—Robert L. Richardson
Attorney, Agent, or Firm—Eugene M. Whitacre; Paul J. Rasmussen; Robert L. Troike

[57] ABSTRACT

A clock generator is provided which demodulates the burst subcarrier portion of a video signal containing time base errors. The demodulation is with respect to an external subcarrier reference signal so that the demodulator output represents an accurate vector summation of the instantaneous phase and amplitude difference of the incoming video signal relative to the external reference. The demodulator output is utilized to remodulate the external reference signal to provide a rephased subcarrier reference signal which is frequency multiplied and waveshaped to produce a clock signal which is synchronized to the incoming video signal.

5 Claims, 2 Drawing Figures

CLOCK GENERATOR FOR VIDEO SIGNAL PROCESSING

BACKGROUND OF THE INVENTION

This invention relates to a signal processing system for generating a clock signal synchronized to a video information signal, and, in particular, to input clock generators for time base correctors and synchronizers utilized in processing video information signals.

In the reproduction of television video signals from information recorded, for example, on magnetic tape or magnetic discs, as well as from other local or network sources, it is often found that the video signals require time base correction.

In a time base corrector, as shown in U.S. Pat. No. 3,860,952, the incoming video signal is converted into digital form by means of an analog to digital converter and stored in a memory storage means. Time base errors are removed by reading the digitized video signal into the memory storage means at a clocking rate which is made dependent on the time base errors occurring in the incoming video signal. The video signal read into storage at the variable rate is read out of the memory storage means and converted into analog form at a constant clocking rate determined by a local external reference. The variable clocking rate for time base correctors of the type described is generally derived from a voltage controlled oscillator (VCO), the output frequency of which is made dependent on the instantaneous time variations of the incoming video signal. However, it is difficult to generate a clock frequency using a VCO that will be both fast acting and still remain stable for the required time period between television lines. This is particularly true in processing color television signals where the signal perturbations of the color subcarrier burst signal are utilized to shift the output frequency of the VCO.

The normal burst signal of approximately 2μsec (8 to 9 cycles of 3.58 MHz in the NTSC television system) is too short a time for a consistently reliable measurement of the burst phasing and to enable the subsequent VCO correction to match the oscillator frequency phase with the incoming burst signal phasing. Attempts at increasing the speed of the oscillator phase capture time generally tends to decrease the stability of the oscillator output. If the oscillator stability is increased by increasing the oscillator time constants, then several burst signal intervals, i.e., more than one television line period, may be needed to bring the oscillator phasing into the correct phase relationship for properly storing the color video signal. Compromising or balancing oscillator capture speed versus oscillator stability, although helpful, does not completely solve the problem where, for example, the next burst signal may not be available due to signal degradation or where the burst signal is not available as during the vertical blanking interval wherein the burst signal is not produced for nine consecutive television lines. When the burst signal does reappear, it may take the oscillator several television lines to become properly phased with the incoming video signal.

As previously described in connection with the time base corrector illustrated by U.S. Pat. No. 3,860,952, video signals stored in the memory storage means are read out of storage at a constant clocking rate by a stable local reference frequency. This local reference is continuous, of constant subcarrier frequency, and has the desired stability. However, it is not usable directly for the input clock generator frequency since reading into memory must be accomplished at a rate which varies with the time base error of the incoming video signal to achieve time base correction. In accordance with the present invention, the external subcarrier reference signal may be utilized for deriving a variable input clock frequency if the external subcarrier is rephased in accordance with the time perturbations of the incoming video signal. One means of rephasing a subcarrier reference frequency is shown in U.S. Pat. No. 4,001,876 in which a chroma signal is demodulated by a reference signal having the same time base errors as the chroma signal. The demodulated chroma signal is then remodulated onto a stable subcarrier for recombination with the luminance signal to provide a color corrected video signal.

In the present invention, the subcarrier burst signal of an incoming video signal having time base errors is demodulated by a constant frequency reference and the detected error utilized to re-modulate the identical reference to obtain an instantaneously rephased subcarrier which will provide a variable input clock frequency with all the stability of the original reference signal.

SUMMARY OF THE INVENTION

A signal processing system is provided for generating a clock signal synchronized to a video signal. The video signal contains at least a subcarrier burst signal component. The system comprises means for separating the subcarrier burst signal from the video signal. First and second demodulating means coupled to the separating means and to a source of external reference signals at the subcarrier frequency for demodulating the burst signal provide quadrature control signals indicative of the burst signal phasing relative to the reference signals. First and second modulating means responsive to the quadrature control signals and to the source of reference signals rephase the source of reference signals relative to the burst phasing of the video signal. Means responsive to the rephased reference signals generate the synchronized clock signal.

DESCRIPTION OF THE INVENTION

Figure 1:
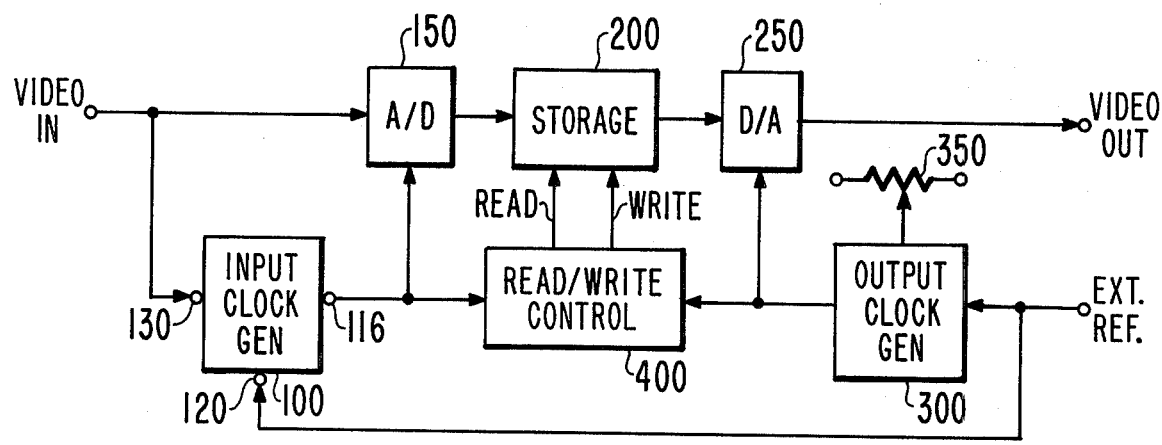
FIG. 1 is a block diagram of a time base corrector system embodying the present invention.

In FIG. 1, a video signal (Video In) from, for example, a pre-recorded tape, is coupled to an input terminal of a time base corrector system shown in block diagram form. The incoming video signal is coupled to an analog-to-digital converter 150 and to an input terminal 130 of input clock generator 100. In clock generator 100, the subcarrier burst signal is separated and compared in phase to an external source of local subcarrier coupled to terminal 120 of the clock generator. Any difference in phasing between the reference subcarrier and the burst signal portion of the incoming video signal generally represents a time base error. Therefore, the instantaneous difference in frequency between the incoming burst signal and the external reference, as indicated by the phase difference between these two signals, is detected and utilized to rephase the external reference subcarrier, as will be described in conjunction with FIG. 2. The rephased subcarrier, which effectively represents the instantaneous frequency difference between the external reference subcarrier and the subcarrier of the incoming video signal, is further waveshaped and processed in the input clock generator 100 to provide the final clock signal. This clock signal is, in turn, coupled to the analog-to-digital converter 150 and the memory storage means 200 by means of Read/Write control function 400. Thus, the jittering incoming video is digitized in the A to D converter and written into memory by a clocked write signal which contains the same time base perturbations as the jittering input video signal.

Memory storage 200 may have a storage capacity of any required line length; typically in a time base corrector, one or more complete television lines of storage are provided. The number of memory elements generally is proportional to the sampling rate, as determined by the clock rate. Although sampling at the 3.58 MHz subcarrier rate is possible, it is general practice to increase the sampling rate to four times subcarrier (14.3 MHz) to yield an improved signal-to-noise ratio and a higher resolution. The video image information, having been transferred into memory storage 200, is now available for readout. Readout is accomplished by utilizing an output clock generator which is locked to the stable external reference signal, generally at the subcarrier frequency. The external subcarrier of constant frequency is coupled to output clock generator 300, wherein the subcarrier frequency is increased to four times subcarrier and waveshaped to provide an output clock signal. The clock signal is, in turn, coupled to Read/Write control 400 and digital-to-analog converter 250. In operation, the video image information stored in memory storage means 200 is read out of storage by a read signal and converted from digital-to-analog form in D to A converter 250 synchronous with the constant clock frequency output of output clock generator 300 derived from the external reference subcarrier signal. A phasing control 350 coupled to ouput clock generator 300 provides a trim adjustment of the phasing of the output clock generator 300 to further compensate for system phasing differences so that the time base corrected video output signal from D to A converter 250 appearing at the VIDEO OUT output terminal may be fine adjusted to any remaining system differences required in the utilization means coupled to the video output terminal.

Figure 2:
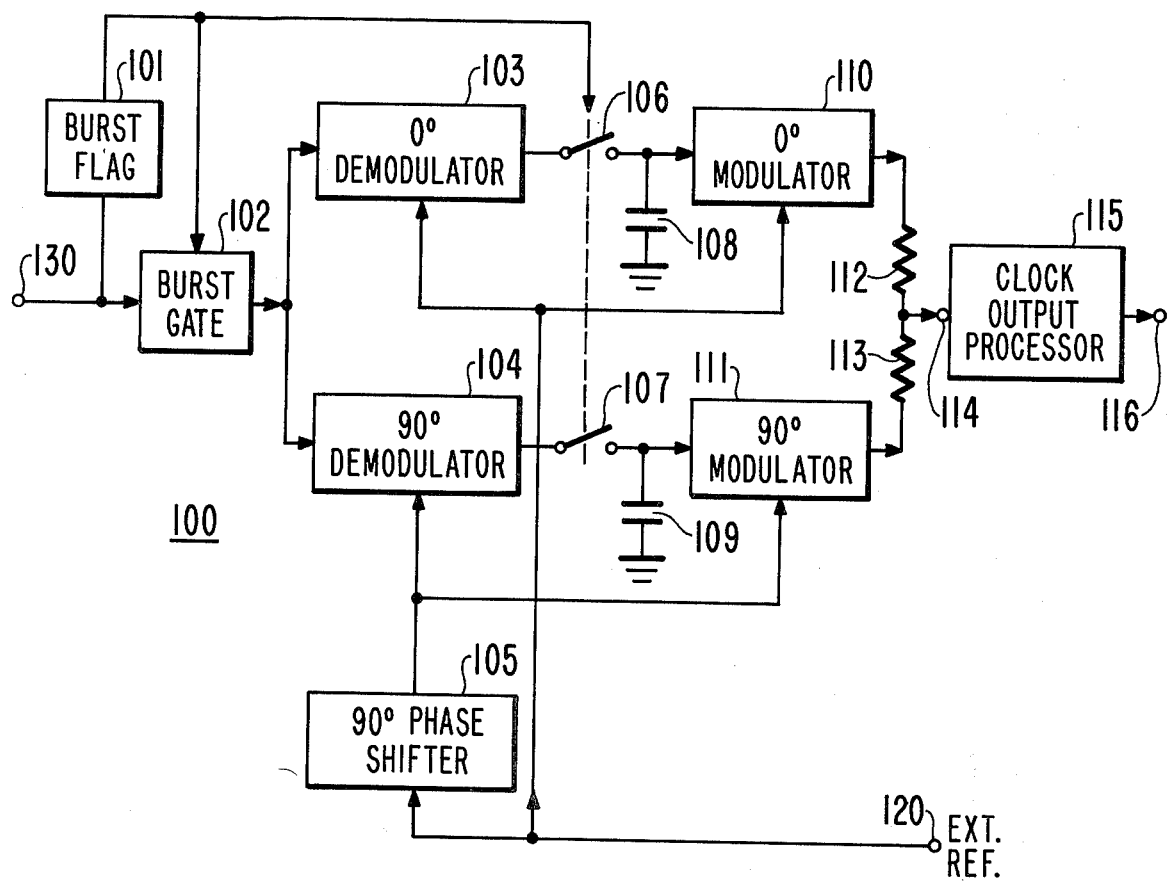
FIG. 2 is a schematic diagram, partially in block diagram form, of a clock generator embodying the present invention.

In FIG. 2, the video input signal is coupled to input terminal 130 and, in turn, to burst gate 102 and burst flag circuit 101. The subcarrier burst signal component of the incoming video signal is separated from the video signal in burst gate 102 during the burst interval as detected by the burst flag signal detector 101. The output signal from burst gate 102 in the form of the subcarrier burst signal component is coupled to two synchronous detectors 103 and 104 operating in a quadrature detection mode from the external subcarrier reference signal coupled to terminal 120. The external reference signal is coupled directly to demodulator 103 and by means of a 90° phase shifter 105 to demodulator 104. The external subcarrier reference has a frequency which is the same as the average subcarrier frequency of the incoming video signal. Demodulators 103 and 104 which may be constructed, for example, from Motorola multiplier integrated circuits MC-1596, provide at their respective output terminals two signals whose amplitude and polarity are an accurate vector representation of the incoming burst phase relative to the external reference signal in quadrature. The output signals from demodulators 103 and 104 are coupled to gated storage circuits 106, 108 and 107, 109, respectively. A gating signal derived from the burst flag detector 101 closes gates 106 and 107 (shown diagrammatically) during the burst interval and couples the output signals from demodulators 103 and 104 to storage capacitors 108 and 109 where two D.C. voltages are produced which represent the burst phasing for that particular television line. The output D.C. control voltages from the gated storage circuits 106, 108 and 107, 109 are coupled, respectively, to one input of modulators 110 and 111 constructed, for example, in a similar manner utilizing the previously identified integrated circuits MC-1596. The other input to the modulators 110 and 111 is the same external reference signal of constant phase with one modulator reference signal input shifted 90° for quadrature operation of the modulators. In operation, the D.C. voltages stored in gate circuits 106, 108 and 107, 109, the vector sum of which represents the incoming burst phase, are utilized to modulate or rephase the external signal. The output terminals of the modulators 112 and 114 are coupled to a common tie point 114 by summing resistors 112 and 113, respectively.

The signal at terminal 114 in the form of a rephased subcarrier reference signal represents a continuous waveform signal which can rapidly adjust in phase to follow the incoming burst phasing and hold that phase throughout the entire television line. The phasing of the rephased subcarrier is updated once each television line with fresh information by means of the gating circuits which are gated on during the burst interval occurring during each active television line. If for any reason, as previously described, the burst signal is not available on any television line, the modulator output is maintained at its previous line phasing without a loss of stability.

The rephased subcarrier appearing at terminal 114 is coupled to an input terminal of output clock processor 115. Output clock processor 115 may include frequency multiplying means as previously described to increase the clock frequency, i.e., 4 × Subcarrier to 14.3 MHz or any desired fraction or multiple thereof. Additionally, clock output processor 115 may include waveshaping, filtering and amplifying means to provide sharply defined clock output pulses at the output terminal 116.

What is claimed is:

1. A signal processing system for generating a clock signal synchronized to a video signal containing at least a subcarrier burst signal component, comprising:
   means for separating said subcarrier burst signal from said video signal;
   a source of external reference signals at the subcarrier frequency;
   first and second demodulating means coupled to said separating means and to said reference signals for demodulating said burst signal to provide quadrature control signals indicative of said burst signal phasing relative to said reference signals;
   first and second modulating means responsive to said quadrature control signals and to said source of reference signals for rephasing said source of reference signals relative to the burst phasing of said video signal; and
   means responsive to said rephased reference signals for generating said synchronized clock signal.

2. A signal processing system according to claim 1 further including sample and hold means comprising first and second gate circuits coupled to first and second signal storage circuits, said gate circuits being responsive to said burst signal for coupling said quadrature control signals to said modulators once each television line.

3. A signal processing system according to claim 1 further comprising signal multiplier means responsive to said modulator means output signal for providing n multiples of said external reference signals.

4. A signal processing system according to claim 3 wherein n equals any fractional or whole number.

5. A signal processing system for removing time base errors from video information signals in which incoming video signals having synchronizing, subcarrier burst and image information signal components are sampled and read into memory storage means by clocking signals established by an input clock generator having a variable rate dependent on said time base errors, said stored video information being read out of said memory storage means at a constant clocking rate established by an output clock locked to an external subcarrier reference wherein said input clock generator comprises:

means for separating said subcarrier burst signal from said video signal;

first and second demodulating means coupled to said separating means and to said external reference signals for demodulating said burst signal to provide quadrature control signals indicative of said burst signal phasing relative to said external reference signals;

first and second modulating means responsive to said quadrature control signals and to said source of external reference signals for rephasing said source of external reference signals relative to the burst phasing of said video signal; and means responsive to said rephased reference signals for generating said synchronized clock signal.

* * * * *